United States Patent [19]
Cyr

[11] Patent Number: 5,571,275
[45] Date of Patent: Nov. 5, 1996

[54] WEAR BLADE FOR SNOWMOBILE ENDLESS TRACK SUSPENSION

[76] Inventor: Paul A. Cyr, 7 Willimantic Ct., Presque Isle, Me. 04769

[21] Appl. No.: 476,560

[22] Filed: Jun. 7, 1995

[51] Int. Cl.[6] .................................................. B62D 55/10
[52] U.S. Cl. .......................... 305/127; 305/124; 384/908
[58] Field of Search .................................. 305/16, 21, 24, 305/35 R, 35 EB; 252/11, 25, 26, 28, 29; 384/42, 908

[56] References Cited

U.S. PATENT DOCUMENTS

| | | |
|---|---|---|
| 3,613,811 | 10/1971 | Brandli et al. ............... 305/24 X |
| 3,680,925 | 8/1972 | Spivy . |
| 3,744,583 | 7/1973 | Bedard ....................... 305/24 X |
| 3,770,330 | 11/1973 | Bombardier ................ 305/24 |
| 3,820,858 | 6/1974 | Reeve . |
| 3,841,717 | 10/1974 | Parisotto et al. . |
| 3,887,242 | 6/1975 | Russ, Sr. . |
| 4,036,320 | 7/1977 | Rabehl . |
| 4,283,094 | 8/1981 | Bertelsen . |
| 4,666,787 | 5/1987 | Bickle et al. ............... 384/908 X |
| 4,842,086 | 6/1989 | Michna . |
| 4,892,669 | 1/1990 | Marcora et al. ............ 252/29 X |
| 5,364,682 | 11/1994 | Tanaka et al. ............. 384/908 X |

OTHER PUBLICATIONS

ENFLO Canada Limited Sales Brochure Dec. 1994.
ENFLO Corporation Distributor Price List No. 79 (effective Feb. 1, 1979).

*Primary Examiner*—Russell D. Stormer
*Attorney, Agent, or Firm*—Oliff & Berridge

[57] ABSTRACT

An improved wear blade which slidingly engages an endless track of a snowmobile, and presses the endless track against the ground, has low friction, is highly wear resistant, and comprises polytetrafluoroethylene (PTFE), and one or more of carbon, graphite, bronze, and molybdenum disulfide.

12 Claims, 4 Drawing Sheets

WEAR BLADE FOR SNOWMOBILE ENDLESS TRACK SUSPENSION

BACKGROUND OF THE INVENTION

1. Field of the Invention

This invention generally relates to wheel substitutes for land vehicles, and more particularly, to slide bar suspension systems used in snowmobile endless track suspensions.

2. Description of Related Art

In one form of tracked snowmobiles, where an endless track contacts the snow or ground surface and moves the snowmobile, a slide rail in the snowmobile's suspension transfers the weight of the snowmobile to the ground surface by slidingly contacting the endless track to press the endless track against the ground.

Snowmobiles have over the years become heavier, faster, and more powerful, and therefore slide rails on modern snowmobiles are subject to greater mechanical and heat stresses than in past years. Slide rails are the component of snowmobiles which bear the weight of the snow sled inside of the track. The track rotates around the snowmobile suspension. The snowmobile suspension typically has two slide rails running lengthwise with the track. The track slides under the slide rails and contacts the ground surface. In addition, these stresses are magnified when snowmobiles are operated under adverse conditions, such as, on surfaces where there is no snow or water to cool and lubricate the interface between the slide rail and the endless track, or on surfaces which cause debris such as dirt, sand, and gravel to contaminate the interface between the slide rail and the endless track.

The concept of using plastic to form a wear blade inserted between a snowmobile slide rail and an endless track is known in the art. In particular, U.S. Pat. No. 3,770,330 to Bombardier discloses a replaceable wear blade attached to a snowmobile slide rail. The endless track slides against the wear blade. The replaceable wear blade of Bombardier is formed from a synthetic resin, including synthetic plastics such as polytetrafluoroethylene (PTFE), nylon, polyurethane and ultra high density polyethylene.

U.S. Pat. No. 3,820,858 to Reeve, which discloses a track lubrication system useable with snowmobiles, discloses slide rails formed of or covered with a plastic-like or slippery material such as polytetrafluoroethylene (PTFE).

One conventional slide rail system in current commercial use incorporates a Hyfax-type slider, manufactured by several different companies. One such company is Garland Industries, P.O. Box 538, Saco, ME, 04072. This Hyfax-type slider comprises a pair of sliders which are three (3) to five (5) foot pieces of ultra high molecular weight plastic (UHMW), which are attached to the slide rails so they run lengthwise with the endless track. These sliders press the endless track against the ground surface, so that as the endless track rotates, it slides under the pair of sliders.

SUMMARY OF THE INVENTION

This invention provides a wear blade disposed between a slide rail and an endless track. The slide rail presses the endless track against the ground surface and the track slides against the wear blade. The wear blade is made of a composition comprising polytetrafluoroethylene (PTFE) and at least one of graphite, carbon, bronze, and molybdenum disulfide (MoS2). The wear blade having this composition has lower friction and much greater wear resistance than conventional slide rails.

BRIEF DESCRIPTION OF THE DRAWINGS

This invention will be described in detail with reference to the following drawings, wherein.

DETAILED DESCRIPTION OF THE PREFERRED EMBODIMENT

Figure 1:
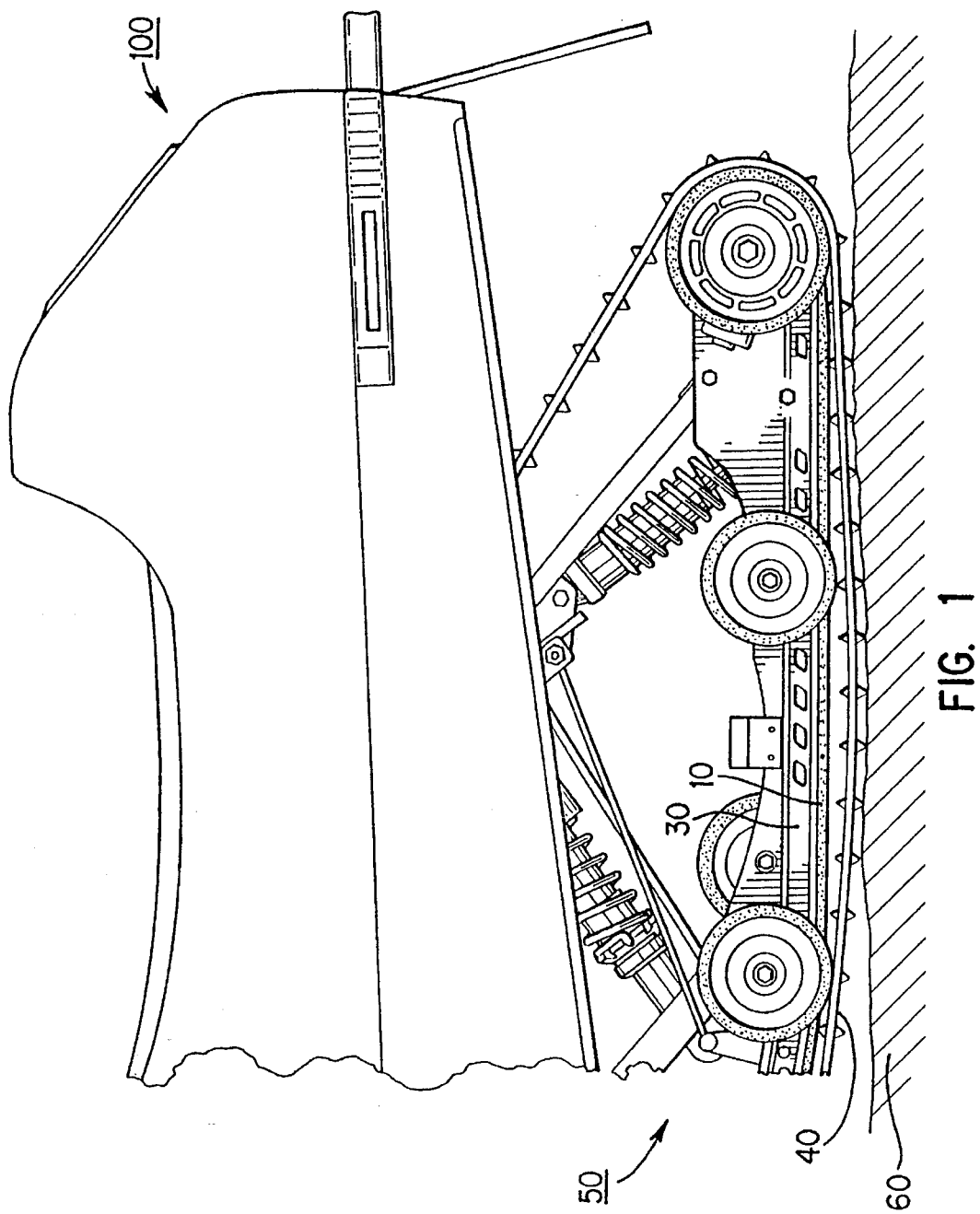
FIG. 1 shows a side view of a snowmobile.

FIG. 1 shows a snowmobile 100 having a snowmobile suspension 50. The snowmobile suspension includes a slide rail 30 which presses a wear blade 10 against an endless track 40 to transfer the weight of the snowmobile 100 through the wear blade 10 and the endless track 40 to the ground surface 60. The wear blade 10 is positioned between the slide rail 30 and the endless track 40 so that the endless track 40 slides against the wear blade 10 rather than against the slide rail 30.

The wear blade 30 is preferably formed of a composition comprising PTFE and one or more of the following fillers: carbon, graphite, bronze, and molybdenum disulfide. Wear blades 30 of this composition has been found to offer superior performance. These fillers increase performance of the wear blade 10 by preventing the PTFE from flowing and deforming under pressure and over time. Thus, these fillers substantially maintain and enhance the lubricity of the PTFE, and increase the thermal conductivity of the wear blade 10 to better carry excess heat away from the sliding contact interface between the wear blade 10 and the endless track 40.

Specifically, a composition comprising PTFE and a bronze powder filler shows increased strength and thermal conductivity. A wear blade 10 comprising PTFE and bronze powder both endures higher pressures without deforming or creeping, and carries excess heat away from the surface of the wear blade 10 when it is in high speed rubbing contact with the endless track 40.

A composition comprising PTFE and an amorphous carbon powder filler and a graphite powder filler has good wear and sliding contact characteristics when both dry and in water. The amorphous carbon and graphite powders are also relatively soft, and reduce sliding contact wear by entrapping foreign particles and subsuming the particles into their surfaces, away from the sliding contact. The overall hardness of the wear blade 10 can be adjusted by selectively adjusting the relative proportions of the graphite and the amorphous carbon in the wear blade 10. In addition, the amount of carbon and graphite can be combined with the exact amount of each being indefinite, by referring to "carbon graphite."

A composition comprising PTFE and a molybdenum disulfide filler increases stiffness and surface hardness of the wear blade 10, and reduces both the static coefficient of friction and the steady-state wear.

The wear blade 10 formed of a composition comprising about 75% PTFE, about 20% carbon, and about 5% graphite, by weight, has been found to have an optimal combination of lubricity and wear resistance which far exceeds those of conventional plastic wear blades. Accordingly, the wear blade 10 is preferably formed from this composition. However, the wear blade 10 can be formed from other compositions of PTFE, carbon and graphite. These other compositions can additionally include either bronze, molybdenum disulfide, or both. These other compositions also provide good lubricity and high wear resistance. These compositions include:

a) a composition comprising about 50% to about 90% PTFE, about 10% to about 35% carbon, 0% to about 10% molybdenum disulfide, and 0% to about 10% graphite by weight;

b) a composition comprising about 70% to about 95% PTFE, 0% to about 10% molybdenum disulfide, and about 5% to about 20% graphite by weight;

c) a composition comprising 80% to about 95% PTFE, about 5% to about 10% molybdenum disulfide, and 0% to about 10% graphite by weight;

d) a composition comprising 50% to about 70% PTFE, about 10% to about 35% carbon, about 20% to about 40% bronze, 0% to about 10% molybdenum disulfide, and 0% to about 10% graphite by weight; and e) a composition comprising about 30% to about 80% PTFE, about 20% to about 65% bronze, 0% to about 10% molybdenum disulfide, and 0% to about 10% graphite by weight.

Specific compositions within these ranges can be obtained from the ENFLON™ of filled PTFE compositions, manufactured by ENFLO Canada Ltd., 73 Industrial Road, Post Office Box 1780, Grand Falls, New Brunswick, E3Z 1E1, Canada, and are listed in Table 1, below.

TABLE 1

| Product Designation | % PTFE | % Carbon | % Graphite | % Carbon Graphite | % Bronze | % MoS$_2$ |
| --- | --- | --- | --- | --- | --- | --- |
| ENFLO 110 | 95 | 0 | 5 | 0 | 0 | 0 |
| ENFLO 111 | 90 | 0 | 10 | 0 | 0 | 0 |
| ENFLO 112 | 85 | 0 | 15 | 0 | 0 | 0 |
| ENFLO 113 | 80 | 0 | 20 | 0 | 0 | 0 |
| ENFLO 116 | 60 | 0 | 0 | 0 | 40 | 0 |
| ENFLO 118 | 40 | 0 | 0 | 0 | 60 | 0 |
| ENFLO 127 | 95 | 0 | 0 | 0 | 0 | 5 |
| ENFLO 132 | 85 | 15 | 0 | 0 | 0 | 0 |
| ENFLO 133 | 80 | 20 | 0 | 0 | 0 | 0 |
| ENFLO 134 | 75 | 25 | 0 | 0 | 0 | 0 |
| ENFLO 136 | 90 | 0 | 0 | 10 | 0 | 0 |
| ENFLO 138 | 75 | 0 | 0 | 25 | 0 | 0 |
| ENFLO 170 | 55 | 0 | 0 | 0 | 40 | 5 |
| ENFLO 172 | 40 | 0 | 0 | 0 | 55 | 5 |
| ENFLO 173 | 30 | 0 | 0 | 0 | 65 | 5 |

The preferred composition and the other compositions all provide better lubricity and substantially greater wear resistance than conventional plastic wear blades such as Hyfax-type sliders, which are made of ultra high molecular weight plastic (UHMW). In addition, the wear blade of this invention with these compositions lasts longer than 100% PTFE wear blades when used either continuously for extended periods of time or in high pressure conditions, as with heavy snowmobiles. It should be appreciated that among the preferred compositions set forth above, experiments show that those comprising, by weight, about 50% or more PTFE exhibit wear and lubricity characteristics superior to those comprising, by weight, less than about 50% PTFE.

Figure 2:
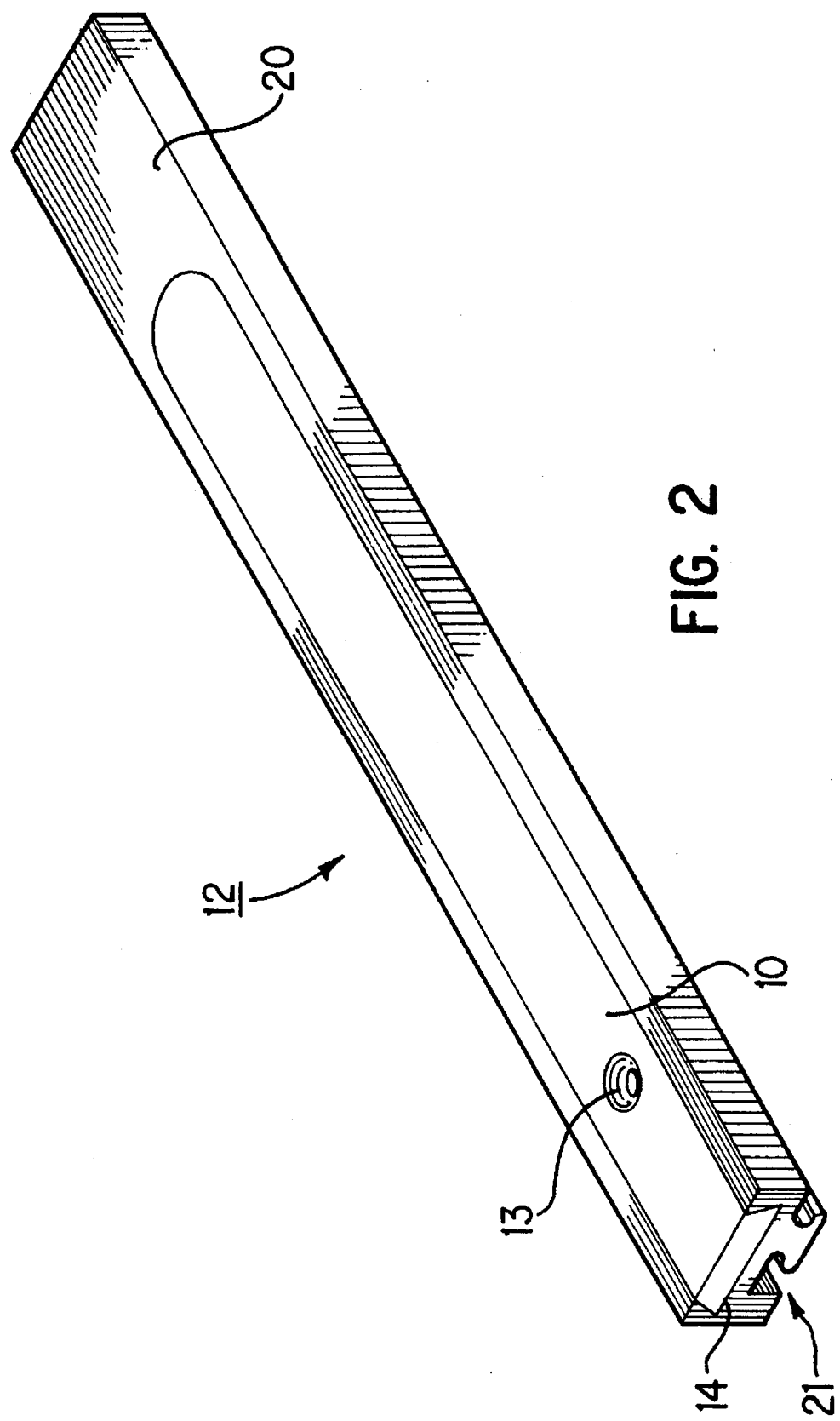
FIG. 2 shows a preferred embodiment of the wear blade.

As shown in FIG. 2, the wear blade 10 is preferably about 4 feet long, about 1 inch wide, and about 0.2 inches thick, and is attached to the slide rail 30 by means of a carrier 20. The carrier 20 is preferably formed from a Hyfax-type slider. The carrier 20 facilitates attaching the wear blade 10 to the slide rail 30. The carrier 20 is placed between the slide rail 30 and the wear blade 10 so that the endless track 40 slides against the wear blade 10.

As shown in FIG. 2, the wear blade 10 is attached to the carrier 20 by a dovetail groove 14 formed in the carrier 20. The wear blade 10 is also formed in the opposite dovetail shape and is inserted into the dovetail groove 14. The wear blade 10 and the carrier 20 together form a blade carrier combination 12.

Figure 4:
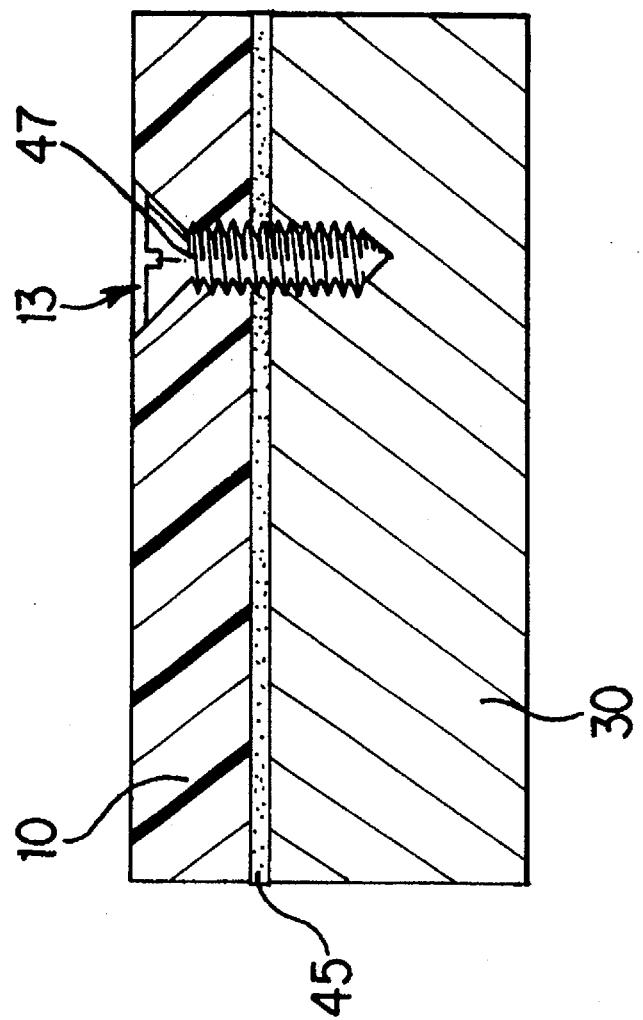
FIG. 4 shows methods of attaching an embodiment of the wear blade to the slide rail.

A fastener (not shown) can be as shown in FIG. 4, the wear blade 10 is fastened to the slide rail 30 by means of an adhesive 45 and a threaded fastener 47 that passes through inserted into a fastener hole 13 formed in the blade 10 and secures the wear blade 10 to either of the carrier 20 and/or the slide rail 30. The carrier 20 is also formed with a carrier attachment groove 21 to facilitate attaching the blade carrier combination 12 to the slide rail 30.

Figure 3:
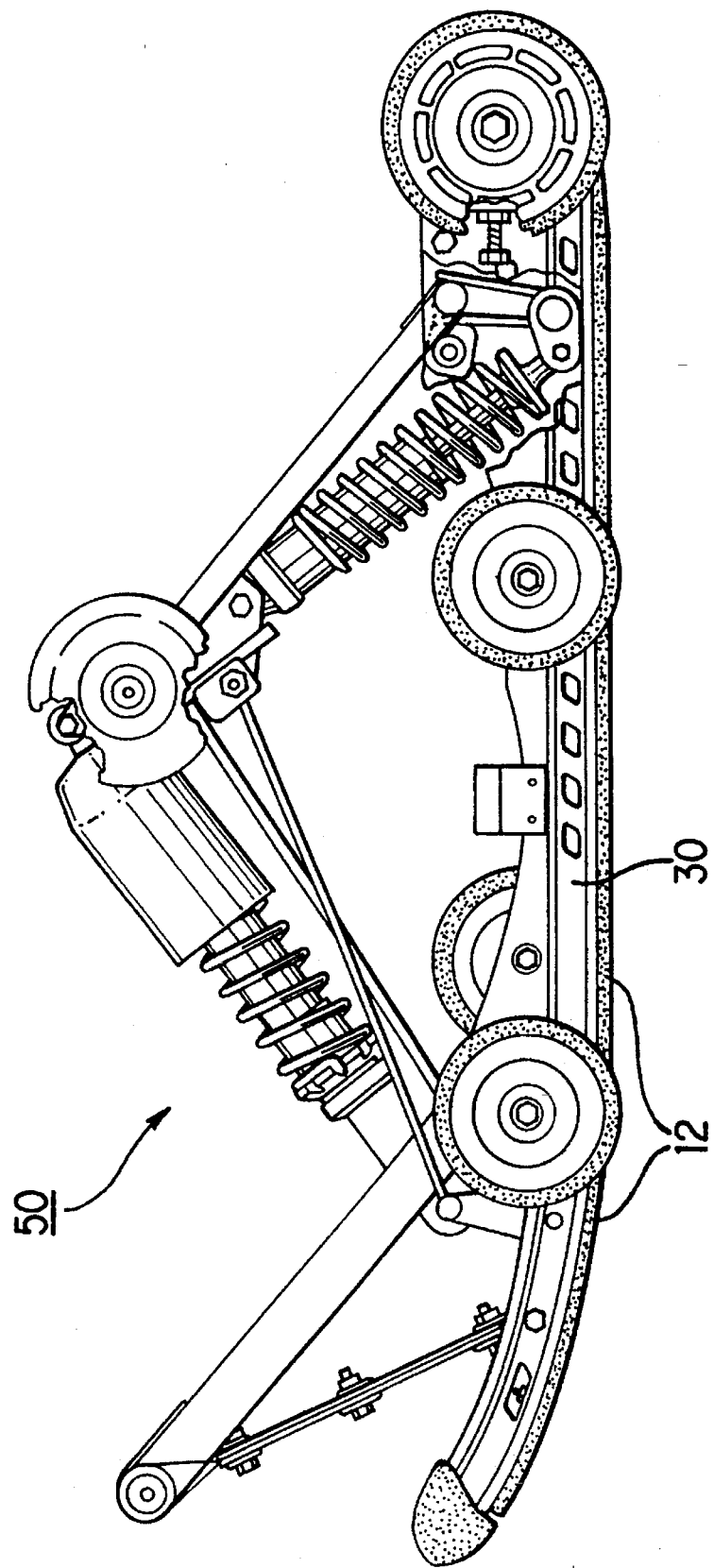
FIG. 3 shows a side view of the wear blade of FIG. 2 incorporated into a snowmobile suspension.

FIG. 3 shows the snowmobile suspension 50 in greater detail. As shown in FIGS. 1 and 3, the blade carrier combination 12 is attached to the underside of the slide rail. It should be understood that various other means known to those skilled in the art may be used to attach the wear blade 10 to the carrier 20 and the carrier 20 to the slide rail 30. These include methods of attachment by adhesive, by use of a threaded fastener, by use of a fastener passing through the wear blade and by use of a groove formed in one of the slide rail and the wear blade, into which is slid a matching tongue formed on the other of the slide rail and wear blade.

While this invention has been described in conjunction with the above-outlined specific embodiments, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An endless track device, comprising:

an endless track engaging a ground surface;

a slide rail for pressing a portion of the endless track against the ground surface; and a wear blade connected to the slide rail, the endless track slidingly contacting the wear blade;

wherein the wear blade comprises a composition comprising by weight:
about 20% carbon;
about 5% graphite; and about 75% polytetrafluoroethylene.

2. The device of claim 1, wherein the wear blade extends longitudinally along the slide rail.

3. The device of claim 1, wherein the wear blade is attached to the slide rail by at least one of:

an adhesive;

a threaded fastener;

a fastener passing through the wear blade; and a groove formed in one of the slide rail and the wear blade, a matching tongue formed on the other of the slide rail and wear blade.

4. An endless track device comprising:

an endless track engaging a ground surface;

a slide rail for pressing a portion of the endless track against the ground surface; and a wear blade connected to the slide rail, the endless track slidingly contacting the wear blade;

wherein the wear blade comprises a composition comprising by weight:
about 50% to about 70% polytetrafluoroethylene;
about 10% to about 30% carbon; and
about 20% to about 40% bronze;
0% about 10% molybdenum disulfide; and
0% to about 10% graphite.

5. The device of claim 4, wherein the wear blade extends longitudinally along the slide rail.

6. The device of claim 4, wherein the wear blade is attached to the slide rail by at least one of:

an adhesive;

a threaded fastener;

a fastener passing through the wear blade; and a groove formed in one of the slide rail and the wear blade, a matching tongue formed on the other of the slide rail and wear blade.

7. A device for pressing an endless track against a ground surface, comprising:

a slide rail for pressing a portion of the endless track against the ground surface; and a wear blade connected to the slide rail, the endless track slidingly contacting the wear blade;

wherein the wear blade comprises a composition comprising by weight:
about 20% carbon;
about 5% graphite; and
about 75% polytetrafluoroethylene.

8. The device of claim 7, wherein the wear blade extends longitudinally along the slide rail.

9. The device of claim 7, wherein the wear blade is attached to the slide rail by at least one of:

an adhesive;

a threaded fastener;

a fastener passing through the wear blade; and a groove formed in one of the slide rail and the wear blade, a matching tongue formed on the other of the slide rail and wear blade.

10. A device for pressing an endless track against a ground surface, comprising:

a slide rail for pressing a portion of the endless track against the ground surface; and a wear blade connected to the slide rail, the endless track slidingly contacting the wear blade;

wherein the wear blade comprises a composition comprising by weight:
about 50% to about 70% polytetrafluoroethylene;
about 10% to about 30% carbon; and
about 20% to about 40% bronze;
0% to about 10% molybdenum disulfide; and
0% to about 10% graphite.

11. The device of claim 10, wherein the wear blade extends longitudinally along the slide rail.

12. The device of claim 10, wherein the wear blade is attached to the slide rail by at least one of:

an adhesive;

a threaded fastener;

a fastener passing through the wear blade; and a groove formed in one of the slide rail and the wear blade, a matching tongue formed on the other of the slide rail and wear blade.

* * * * *